US010813497B2

United States Patent
Fritz et al.

(10) Patent No.: US 10,813,497 B2
(45) Date of Patent: Oct. 27, 2020

(54) HEATING ELEMENT CONTROLLER FOR OIL BASED FRYER

(71) Applicant: Henny Penny Corporation, Eaton, OH (US)

(72) Inventors: Jacob Dean Fritz, Hamilton, OH (US); Adrian Jason Pereira, Dayton, OH (US); Mark Gogel, Richmond, IN (US); Edward J. Florkey, Vandalia, OH (US)

(73) Assignee: Henny Penny Corporation, Eaton, OH (US)

( * ) Notice: Subject to any disclaimer, the term of this patent is extended or adjusted under 35 U.S.C. 154(b) by 228 days.

(21) Appl. No.: 15/972,525

(22) Filed: May 7, 2018

(65) Prior Publication Data

US 2018/0333005 A1    Nov. 22, 2018

Related U.S. Application Data

(60) Provisional application No. 62/507,945, filed on May 18, 2017.

(51) Int. Cl.
    *A47J 37/12*    (2006.01)
(52) U.S. Cl.
    CPC ....... *A47J 37/1266* (2013.01); *A47J 37/1257* (2013.01); *A47J 37/12* (2013.01); *A47J 37/1209* (2013.01)
(58) Field of Classification Search
    CPC .... A47J 37/1266; A47J 37/1257; A47J 37/12; A47J 37/1209
    See application file for complete search history.

(56) References Cited

U.S. PATENT DOCUMENTS

| 4,812,625 | A | 3/1989 | Ceste, Sr. |
|---|---|---|---|
| 4,845,341 | A | 7/1989 | Rae |
| 4,913,038 | A | 4/1990 | Burkett et al. |
| 5,350,900 | A | 9/1994 | Inage et al. |
| 5,582,755 | A | 12/1996 | Maher, Jr. et al. |

(Continued)

FOREIGN PATENT DOCUMENTS

WO    WO-2004019743 A1 *    3/2004    .......... A47J 37/1266

OTHER PUBLICATIONS

European Patent Office, Search Report issued in EP Application No. 18 17 2351 dated Sep. 27, 2018 (8 pages).

*Primary Examiner* — Bayan Salone
(74) *Attorney, Agent, or Firm* — Wood Herron & Evans LLP

(57) ABSTRACT

Systems, methods, and computer program products are disclosed for controlling a fryer having a high limit module. The high limit module selectively decouples a heater of the fryer from an energy source in response to a signal received from a high limit temperature probe indicating a maximum allowable temperature has been exceeded at a hard trip condition. A controller monitors signals received from an operational temperature probe and the high limit temperature probe. Based on these signals, the controller determines if the high limit module is approaching the hard trip condition. If the controller determines the high limit module is approaching the hard trip condition, it preemptively adjusts the output of the heater to avoid the hard trip condition. The controller may thereby prevent the fryer from being completely deactivated by the high limit module.

8 Claims, 6 Drawing Sheets

(56) References Cited

U.S. PATENT DOCUMENTS

| | | |
|---|---|---|
| 5,809,994 A | 9/1998 | Maher, Jr. |
| 5,927,181 A | 7/1999 | Desnoyers et al. |
| 6,018,150 A | 1/2000 | Maher, Jr. |
| 6,345,571 B2 | 2/2002 | Tateyama |
| 6,427,580 B1 | 8/2002 | Benedictus et al. |
| 7,322,278 B2 | 1/2008 | Mercer et al. |
| 8,659,438 B2 * | 2/2014 | Pforte ................ G05D 23/1931 340/584 |
| 2011/0175737 A1 * | 7/2011 | Pforte ................ G05D 23/1931 340/584 |

* cited by examiner

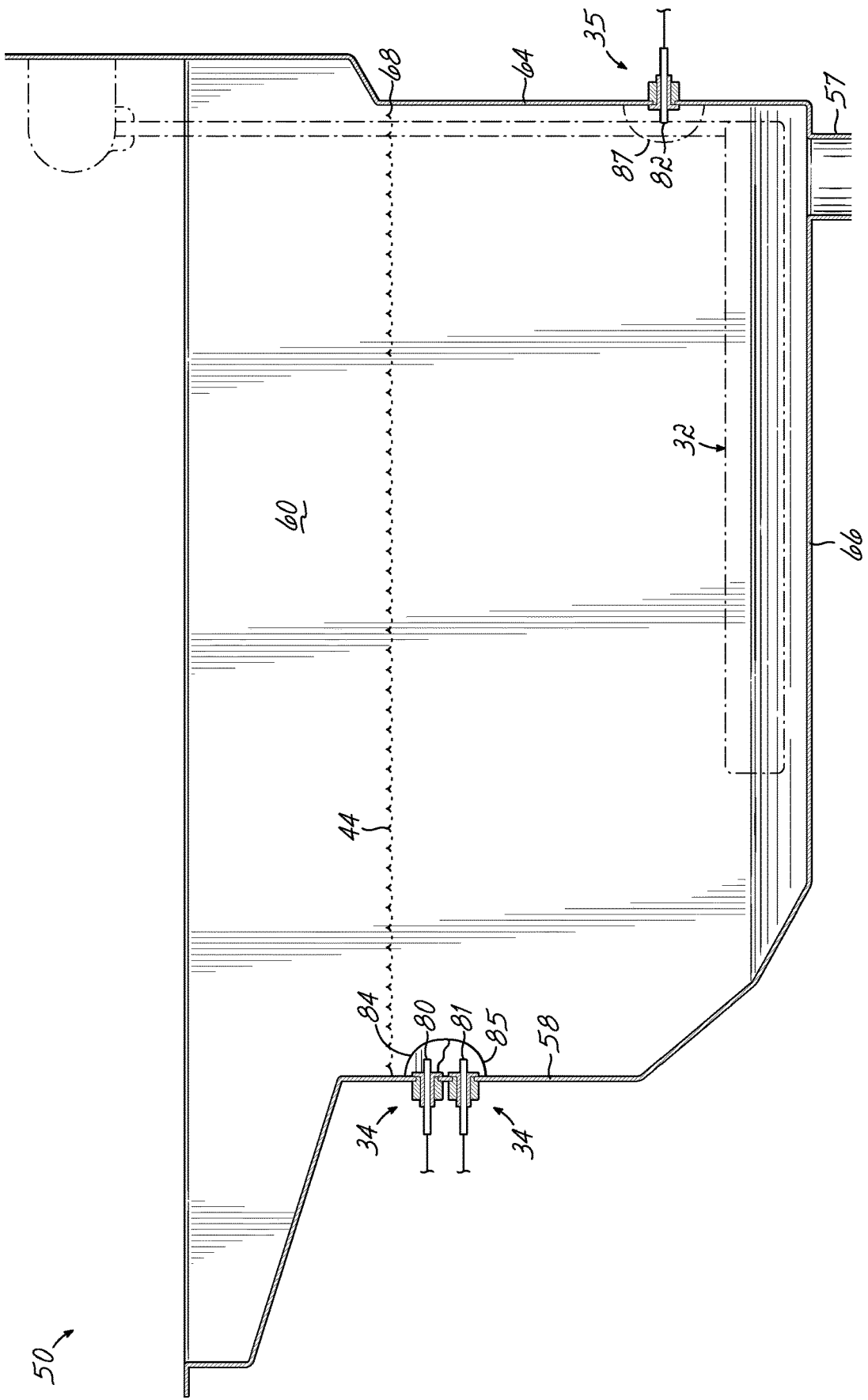

FIG. 4C  FIG. 4D

HEATING ELEMENT CONTROLLER FOR OIL BASED FRYER

CROSS-REFERENCE TO RELATED APPLICATION

This application claims the benefit of U.S. Provisional Patent Application No. 62/507,945, filed May 18, 2017, the disclosure of which is incorporated by reference herein in its entirety.

TECHNICAL FIELD

The invention generally relates to fryers, and in particular, to systems and methods for controlling a heater of the fryer to improve temperature management of a cooking medium.

BACKGROUND

Oil-based frying is commonly used as a cooking method for a wide range of food, such as poultry, fish, and potato products. Commercial fryers include one or more fry pots that are filled with a cooking medium such as oil or solid fats. Heat is provided to the cooking medium using a heater, which typically includes an electrical heating element submerged in the cooking medium or a gas burner thermally coupled to the cooking medium though the walls of the fry pot. When the cooking medium reaches a preset cooking temperature, food products are placed into the cooking medium for a predetermined amount of time during which the food products are cooked by heat from the cooking medium. To facilitate insertion and removal of the food product, the food product is typically placed inside a container, such as a wire basket, and the container lowered into the cooking medium for the predetermined amount of time.

Fryers typically include an electronic controller that controls the temperature of the cooking medium by adjusting the output of the heater. To this end, the controller monitors the temperature of the cooking medium and adjusts the output of the heater in response to the temperature of the cooking medium varying from a temperature set-point. If the cooking medium becomes too hot, it may begin to break down, releasing free radicals and substances that can give the food products an undesirable flavor. To prevent the cooking medium from being over heated, the fryer may also include a high temperature limit module configured to deactivate the heater in response to the temperature of the cooking medium exceeding a maximum allowable temperature.

High temperature limit modules have a hard trip temperature that is set to prevent the temperature of the cooking medium from ever exceeding the maximum temperature. In response to detecting that the temperature of the cooking medium has exceeded the hard trip temperature, the high temperature module cuts power to the heater. The high temperature limit module must then be reset by the operator to resume operation of the fryer after the temperature of the cooking medium has dropped to a suitable level. This need to reset the high temperature module can result in significant down time for the fryer. In particular, the operator may have to wait for several minutes until the temperature of the cooking medium has dropped to a level that allows the high temperature module to be reset. Moreover, because the high temperature module relies on monitoring the temperature of the cooking medium, if the operator powers up the heater without a sufficient amount of cooking medium in the fry pot, it could result in the cooking medium or other components of the fryer exceeding their maximum allowable temperature before the high limit module is tripped. This, in turn, may damage the fry pot.

Thus, there is a need for improved systems, methods, and software products for controlling heaters of fryers that prevents the temperature of the cooking medium from exceeding the maximum temperature.

SUMMARY

To address the deficiencies described above, in accordance with one embodiment, a fryer includes a fry pot, a heater configured to heat a cooking medium in the fry pot, and a high limit temperature probe that provides a first signal indicative of a first temperature in the fry pot. The fryer also includes a high limit module configured to selectively decouple the heater from an energy source in response to the first signal indicating the first temperature has exceeded a first threshold temperature defining a hard trip condition. A controller is provided in communication with the high limit temperature probe. The controller controls operation of the fryer and is configured to determine, based at least in part on the first signal, if the fryer is in a state indicative of an imminent high limit trip condition; and in response to determining that the fryer is in a state indicative of the imminent high limit trip condition, preemptively adjust the output of the heater to avoid the hard trip condition.

In one aspect, the fryer also includes an operational temperature probe that provides a second signal indicative of a second temperature in the fry pot. The controller is further configured to control a temperature of the cooking medium in the fry pot based at least in part on the second signal. The controller may preferably also be configured to determine if the fryer is in the state indicative of the imminent high limit trip condition based at least in part on the second signal.

In another aspect which may be combined with the aspects of each embodiment described herein, the fryer also includes one or more holders that thermally and mechanically couple the temperature probes in position. For example, the operational temperature probe is coupled by a holder to a wall of the fry pot. The high limit temperature probe is coupled by a holder to the heater. A low-level temperature probe may be provided in further embodiments, the low-level temperature probe providing a signal indicative of a second temperature in the fry pot, which the controller uses to help determine if the fryer is in the state indicative of the imminent high limit trip condition. Another holder, or the same holder as for the operational temperature probe, may mechanically and thermally couple the low-level temperature probe to the wall of the fry pot. The fryer of this invention has the technical effect of reliably controlling heaters of fryers to prevent the temperature of the cooking medium from exceeding the maximum temperature.

In another embodiment, a method of controlling a fryer is provided. The method includes receiving, at a controller, a signal indicative of a temperature in a fry pot of the fryer from a high limit temperature probe. The controller determines based at least in part on the signal if the fryer is in a state indicative of an imminent high limit trip condition. In response to determining that the fryer is in a state indicative of an imminent high limit trip condition, the controller preemptively adjusts the output of a heater of the fryer to avoid the hard trip condition.

In a further embodiment, a computer program product for controlling a fryer is provided. The computer program product includes a non-transitory computer-readable storage medium and program code stored on the storage medium.

The program code, when executed by one or more processors of the fryer, causes the fryer to receive a signal indicative of a temperature in a fry pot of the fryer from a high limit temperature probe. The program code also causes the fryer to determine based at least in part on the signal if the fryer is in a state indicative of an imminent high limit trip condition, and in response to determining that the fryer is in a state indicative of an imminent high limit trip condition, preemptively adjust the output of a heater of the fryer to avoid the hard trip condition.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, explain the embodiments of the invention.

FIG. 4B is a cross-sectional side view of the fry pot of FIG. 4A taken along line 4B-4B.

FIGS. 4C and 4D are front views of several of the temperature probes of the fry pot of FIGS. 4A and 4B, and more specifically, depicting probe shields.

DETAILED DESCRIPTION

Embodiments of the invention are directed to systems and methods of controlling a fryer, and in particular, to systems and methods of controlling a heater that heats a cooking medium in a fry pot of the fryer. The heater is controlled to prevent both overheating of the cooking medium, damage to the fryer, and automatic shutdowns due to the temperature of the cooking medium exceeding a maximum allowable temperature.

A controller monitors signals received from operational, cooking medium level, and high limit temperature probes, and detects temperature differentials between these probes and/or rates of temperature changes. Based on this temperature data, the controller determines if a high temperature limit module is approaching a hard trip condition. If the controller determines the high limit module is approaching the hard trip condition, it preemptively adjusts the output of the heater to avoid the hard trip condition. The controller may thereby prevent the high temperature limit module from detecting a hard trip condition. This may prevent the down time that typically results from the trip and reset procedure required for the high temperature limit module each time the hard trip condition occurs.

The controller may also prevent damage to the fryer by determining that there is a sufficient amount of cooking medium in the fry pot when activating the heater. The controller may make this determination based on signals from the temperature probes. If the controller determines that there is not an adequate amount of cooking medium in the fry pot, the controller may regulate the output of the heater to avoid overheating and prompt the operator to add cooking medium to the fry pot.

Figure 1:
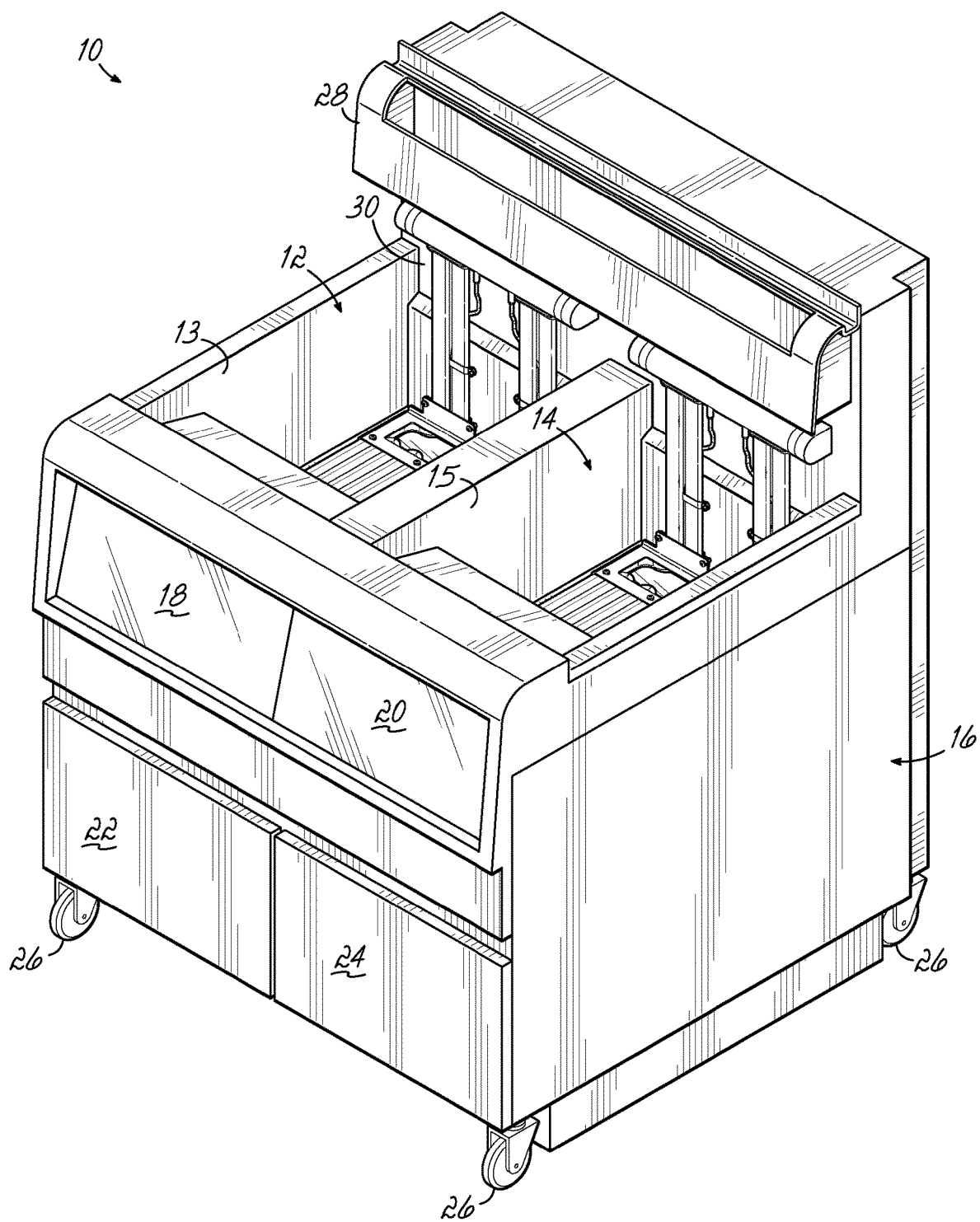
FIG. 1 is a perspective view of a fryer according to an embodiment of the invention.

Referring now to the figures, FIG. 1 depicts an exemplary fryer 10 in accordance with an embodiment of the invention. The fryer 10 includes fry pots 12, 14, a cabinet 16, control panels 18, 20, access panels 22, 24, wheels 26, a basket hanger 28, and a backsplash 30. Each of the fry pots 12, 14, cabinet 16, access panels 22, 24, basket hanger 28, and backsplash 30 may be constructed from stainless steel, mild steel, or some other suitable material. Each fry pot 12, 14 also includes a respective opening 13, 15 though which a food product may be placed into the fryer 10.

A food product may be placed into the fry pots 12, 14, for example, by lowering a basket containing the food product into the fry pot 12, 14. At completion of a cooking cycle, the basket may be removed from the fry pot 12, 14 and hung from the basket hanger 28 to allow excess cooking medium to drain back into the fry pot 12, 14. Each of the fry pots 12, 14 may be associated with a corresponding one of the control panels 18, 20 to provide a human-machine interface for operating the fryer 10. The control panels 18, 20 may receive commands from an operator, and display information regarding a status of the fryer 10 to the operator. The access panels 22, 24 may provide access to the interior of cabinet 16, such as to service the components of the fryer 10.

Exemplary fryer 10 is depicted as having a separate control panel for each fry pot. However, it should be understood that one control panel could be configured to control multiple fry pots, and embodiments of the invention are not limited to fryers having a separate control panel for each fry pot. Suitable cooking mediums may include plant-based fats, animal-based fats, and/or synthetic (e.g., hydrogenated) fats. The heater 32 may be disposed within or proximate to its respective fry pot 12, 14, and configured to heat the cooking medium 44. In addition, although the fryer 10 depicted in FIG. 1 is an electrically heated open fryer having two fry pots, it should be further understood that embodiments of the invention may also be used with pressure fryers and/or gas-heated fryers, as well as fryers having a different number of fry pots.

Figure 2:
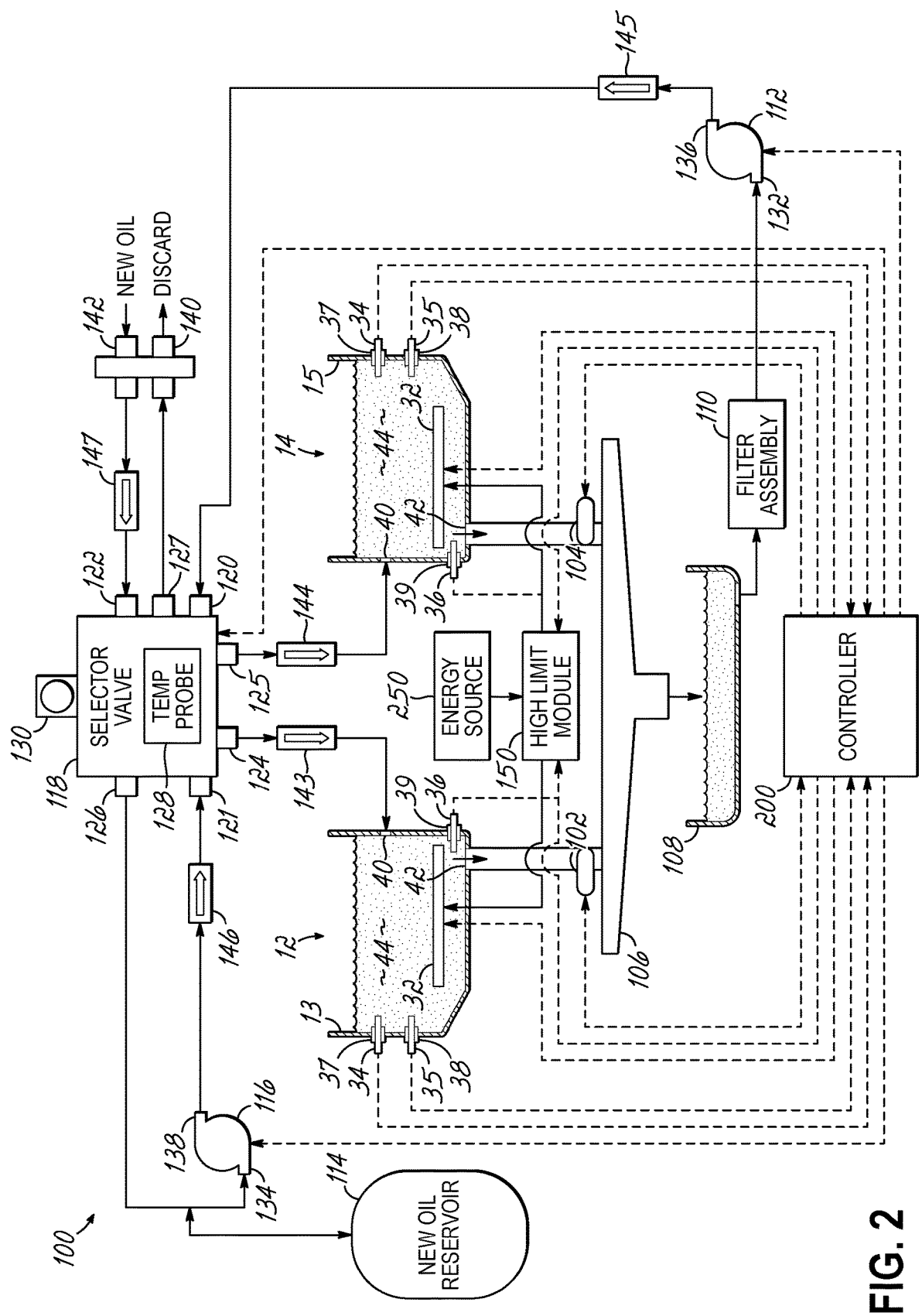
FIG. 2 is a diagrammatic view of the fryer of FIG. 1 depicting a plurality of fry pots each including a heating element and a plurality of temperature probes, a controller, and a high limit module.

Referring now to FIG. 2, in addition to fry pots 12, 14, the fryer 10 may include a cooking medium handling system 100, a high limit module 150, and a controller 200. Each fry pot 12, 14 may include a heater 32, a low-level temperature probe 34, an operational temperature probe 35, a high limit temperature probe 36, a fill port 40, and a drain port 42, and may be at least partially filled with a cooking medium 44. Each of the probes 34-36 may be coupled to the fry pot 12, 14 and/or heater 32 by a respective holder 37-39, and each of the heaters 32 may be coupled to an energy source 250 (e.g., a source of electricity or fuel) by the high limit module 150. The high limit module 150 may be in communication with the high limit temperature probes 36 and configured to interrupt the supply of electric power or combustible gas to the heaters 32 in response to detecting a high limit trip condition. The high limit module 150 may thereby provide a mechanism for interrupting power to the heaters 32 that is independent of the controller 200.

The temperature probes 34-36 may be in communication with the controller 200 and configured so that they are in contact with the cooking medium 44 under normal operating conditions. In particular, the low-level temperature probe 34 may be located within the fry pot 12, 14 at a level different from (e.g., above) the level of the operational temperature probe 35.

Signals from the low-level temperature probe 34 may be used by the controller 200 to determine when cooking medium needs to be added to the fry pot 12, 14. The low-level temperature probe 34 may be located at a level that is suitable for determining the temperature of the cooking medium 44 in a lower extent of a "full zone" of fry pot 12, 14. The level of the low-level temperature probe 34 may be generally above that of the operational temperature probe 35. Signals from the operational temperature probe 35 may be used by the controller 200 to regulate the bulk temperature of the cooking medium, e.g., by comparing the bulk temperature with a predetermined set point temperature.

By way of example, to detect a low-level condition in the fry pot 12, 14, the controller 200 may determine if the temperature difference between the temperature at the operational temperature probe 35 and the temperature at the low-level temperature probe 34 is greater than or equal to a predetermined temperature threshold (e.g., 15° F.), and also determine if the temperature at the low-level temperature probe 34 is less than another predetermined threshold (e.g., 150° F.). If these conditions are met, the controller 200 may interrupt a main heater control process and activate a low-level control process with a predetermined duty cycle. An exemplary duty cycle for the low-level control process may be a 50% duty cycle that alternately activates and deactivates the heater 32 for a predetermined amount of time (e.g., 15 seconds). Once the controller 200 has activated the low-level control process, the controller 200 may remain in this process loop until the conditions that define the low-level condition in the controller 200 (e.g., temperature delta of 15° F. and low-level temperature below 150° F.) are no longer met.

The high limit temperature probe 36 may be located proximate to the heater 32 and/or a heating element of the heater 32. Signals from the high limit temperature probe 36 may be used by the high limit module 150 to determine if power should be cut to the heater 32 to avoid burning the cooking medium and/or damaging the fryer 10. These signals may also be used by the controller 200, either alone or in conjunction with signals from the other temperature probes 34, 35, to determine when the heater 32 should be deactivated to avoid generating a hard trip condition in the fryer 10.

Each of the temperature probes 34-36 may be configured to provide signals to the controller 200 indicative of a temperature in a portion of the fry pot where the respective temperature probe 34-36 is located. When the level of the cooking medium 44 is above or substantially even with a respective one of the temperature probes 34-36, the temperature probe 34-36 may provide a signal to the controller 200 indicative of the temperature of the cooking medium 44 at the respective temperature probe 34-36. When the level of the cooking medium 44 is below the respective temperature probe 34-36, the temperature probe may provide a signal to the controller 200 indicative of the temperature of the air in the fry pot 12, 14 and/or a component of the fryer 10 to which the probe 34-36 is thermally coupled.

During operation of the fryer 10, the temperature of the cooking medium 44 may be greater than the temperature of the air in the fry pot 12, 14. Under these conditions, if the level of the cooking medium 44 falls below the temperature probe 34-36, the controller 200 may detect a drop in temperature readings taken from the respective temperature probe 34-36 as compared to readings taken when the level of the cooking medium 44 is at or above the level of the temperature probe 34-36.

In other cases, the temperature probe 34-36 may have a certain amount of thermal coupling to the fry pot 12, 14 or another component of the fryer 10. For example, a temperature probe 34-36 may be thermally coupled to the fry pot 12, 14 or heater 32 by the holder 37-39 that supports the temperature probe 34-36. In these cases, when the cooking medium 44 is below the level of the probe, the temperature probe 34-36 may provide a signal indicative of the temperature of the component to which the probe is coupled, which may be higher than the temperature of the cooking medium 44.

By way of example, the low-level and operational temperature probes 34, 35 may be attached, and thus thermally coupled, to a wall of the fry pot. In this case, if the level of the cooking medium 44 falls below the either of the low-level temperature probe 34 or operational temperature probe 35, the controller 200 may detect an increase in temperature readings taken from the respective temperature probe 34, 35 as compared to readings taken when the level of the cooking medium 44 is at or above the level of the temperature probe.

This sensed increase in temperature may result from the lack of cooking medium 44 absorbing heat from the wall of the fry pot 12, 14, which would normally decrease the temperature of the wall in contact with the cooking medium 44. As the level of the cooking medium 44 drops below the location of the temperature probe, heat transferred into the wall from the heater 32 may have a longer thermal path to the cooking medium, thereby causing the temperature of the uncovered portion of the wall to increase. This effect may be enhanced by placing the temperature probe proximate to the location of the heater 32. For example, the high limit temperature probe 36 may be located proximate and/or thermally coupled to a portion of the heater 32, such as a heating element of the heater 32. In this configuration, the high limit temperature probe 36 may provide a signal indicative of the temperature of the portion of the heater 32.

The amount of thermal coupling between each probe 34-36 and the portion of the fryer 10 to which it is coupled by its holder 37-39 may be determined by the characteristics of the respective holder 37-39. For example, the use of materials having a high thermal conductivity in the holder 37-39 may produce a strong thermal coupling between the temperature probe 34-36 and the wall or heating element to which the holder is attached. In contrast, the use of insulating layers or materials in the holder 37-39 may produce a weak thermal coupling between the temperature probe 34-36 and the wall or heating element to which the holder 37-39 is attached. The thermal coupling between each probe 34-36 and the component to which it is attached by its respective holder 37-39 may be configured to produce a specific relationship between the temperature of the heater 32, the temperature of the cooking medium 44, and the temperature detected by the probe 34-36.

The high limit temperature probe 36, and the control processes that use signals received from this probe 36, may be configured to provide consistent temperatures and to balance the thermal energy in the heater 32 with the thermal energy in the cooking medium 44. In particular, the probe holder 39 of high limit temperature probe 36 may be configured to position the sensing element of the probe 36 securely and precisely with respect to the heater 32. The temperature probe holder 39 may be further configured to balance the heat received from the heater 32 by conduction through the holder 39 and the heat received from contact with the cooking medium 44, and to maintain these heat transfer characteristics as the fryer 10 ages or when the holder 39 is contaminated by environmental byproducts. The holder 39 may also be configured to facilitate cleaning of the fry pot 12, 14.

The cooking medium handling system 100 may include drain valves 102, 104, a drain manifold 106, a drain pan 108, a filter assembly 110, a filter pump 112, a reservoir 114 of fresh cooking medium, a reservoir pump 116, and a selector valve 118. The selector valve 118 may include a plurality of input ports 120-122, a plurality of output ports 124-127, and a temperature probe 128 that provides the controller 200 with signals indicative of the temperature of the cooking medium 44 flowing through the selector valve 118.

The selector valve 118 is configured to selectively fluidically couple one or more of the input ports 120-122 to one or more of the output ports 124-127. To this end, the selector valve 118 may comprise a rotary valve having a transverse plug (not shown) coupled to a motor 130. The motor 130 may cause the selector valve 118 to fluidically couple a selected input port to a selected output port by rotating the transverse plug to one of a plurality of predetermined positions. In an alternative embodiment of the invention, the selector valve 118 may comprise an assembly of valves that are configured to provide the selected fluidic coupling in response to signals from the controller 200. In this alternative embodiment, the selector valve 118 may comprise an assembly including a plurality of valves connected to a manifold.

The filter pump 112 and reservoir pump 116 each include an inlet 132, 134 on a suction side of the pump, and an outlet 136, 138 on a pressure side of the pump. The inlet 132 of filter pump 112 may be fluidically coupled to the drain pan by the filter assembly 110, and the outlet 136 of filter pump 112 may be fluidically coupled to an input port 120 of selector valve 118. Activation of the filter pump 112 may cause cooking medium 44 to be drawn from the drain pan 108 through the filter assembly 110 and provided to selector valve 118. The selector valve 118 may in turn provide the filtered cooking medium 44 to one of the fry pots 12, 14 for reuse and/or to a discard port 140 for disposal.

Although filter assembly 110 is depicted as being coupled to the inlet 132 of filter pump 112 in the exemplary embodiment illustrated by FIG. 2, it should be understood that the cooking medium handling system 100 is not limited to the specific arrangement of components depicted. For example, the filter assembly 110 could be coupled to the outlet 136 of filter pump 112 rather than the inlet 132 so that cooking medium 44 is pushed through the filter assembly 110 rather than drawn through the filter assembly 110. In either case, the filter assembly 110 may include a housing configured to accept a filter for filtering the cooking medium 44.

The inlet 134 of reservoir pump 116 is fluidically coupled to the reservoir 114, and the outlet 138 of the reservoir pump 116 is fluidically coupled to an input port 121 of selector valve 118. Activation of reservoir pump 116 (e.g., by the controller 200 in response to detecting a low cooking medium condition) may cause cooking medium 44 to be drawn from reservoir 114 and provided to selector valve 118. The selector valve 118 may in turn provide the fresh cooking medium 44 to one of the fry pots 12, 14 to refill or replenish the cooking medium 44. A fill port 142 may be coupled to an input port of the selector valve 118 to facilitate the addition of cooking medium 44 to the reservoir 114. The cooking medium handling system 100 may further include check valves 143-147 that prevent cooking medium 44 from back-flowing from the fry pots 12, 14 into the selector valve 118, or from the selector valve 118 into either of the filter pump 112, reservoir pump 116, or fill port 142.

The controller 200 is in communication with one or more of the heating element 32 and temperature probes 34-36 of each fry pot 12, 14, the drain valves 102, 104, filter pump 112, reservoir pump 116, and motor 130 of selector valve 118. The controller 200 may control the various cooking and maintenance cycles of the fryer 10 by transmitting signals to, and receiving signals from, these components of the fryer 10. The controller 200 may also be coupled to the control panels 18, 20 to provide operating information to, and receive input from, the operator of the fryer 10. The controller 200 may control the temperature of the cooking medium 44 in each fry pot 12, 14 by selectively activating or otherwise controlling the output of the respective heating element 32, and may control the filtering and addition of cooking oil by selectively activating the drain valves 102, 104, filter pump 112, reservoir pump 116, and motor 130 of selector valve 118.

Figure 3:
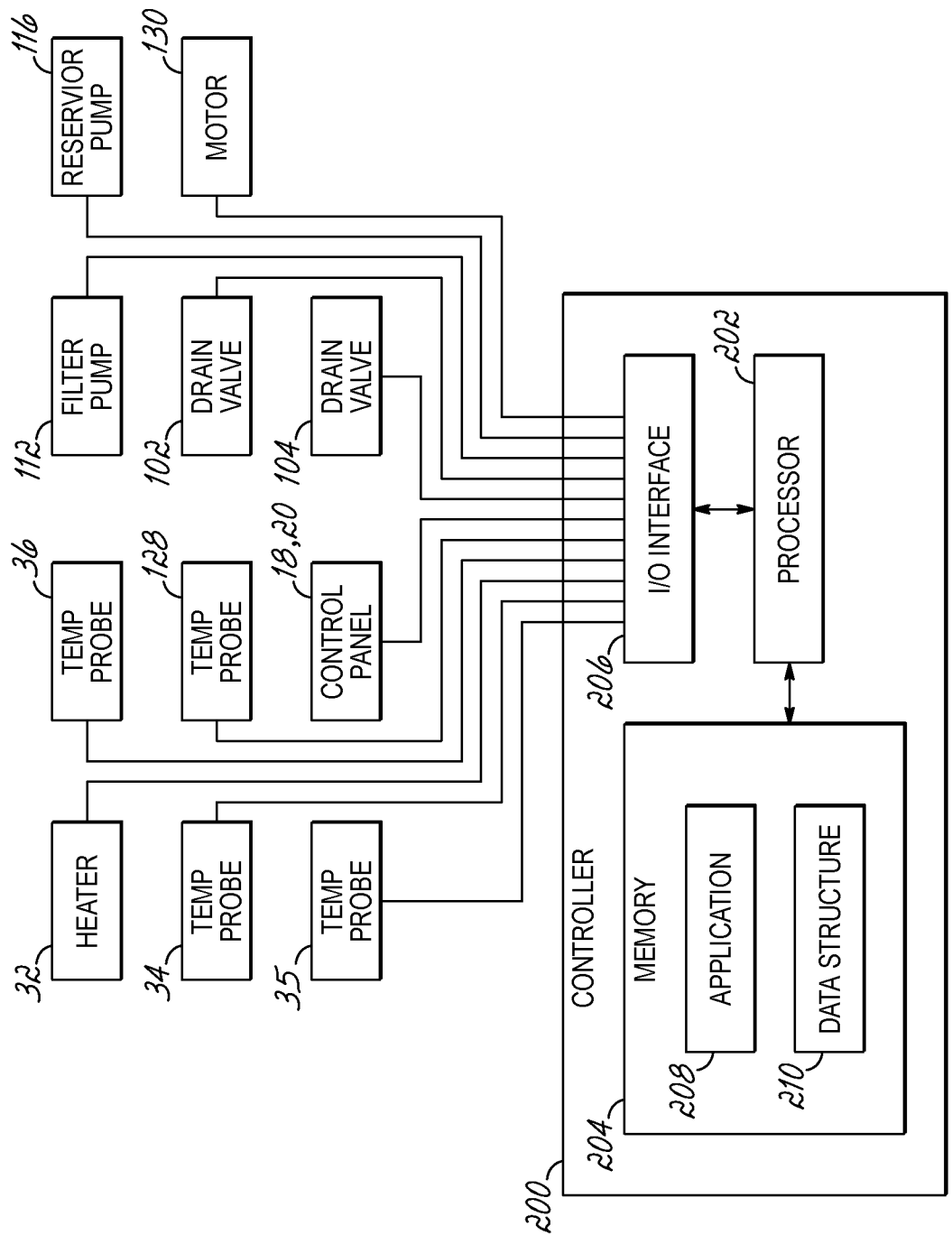
FIG. 3 is a diagrammatic view of the controller, temperature probes, and heating elements of FIG. 2.

Referring now to FIG. 3, the controller 200 may include a processor 202, a memory 204, and an input/output (I/O) interface 206. The processor 202 may include one or more devices configured to manipulate signals and/or data based on operational instructions that are stored in memory 204. Memory 204 may include a single memory device or a plurality of memory devices configured to store information in the form of data. The memory 204 may store computer program code embodied as one or more computer software applications comprising instructions executed by the processor 202, such as a controller application 208. One or more data structures 210 may also reside in memory 204 and may be used by the processor 202 and/or controller application 208 to store and process data.

The I/O interface 206 operatively couples the processor 202 to other components of the fryer 10, such as control panels 18, 20, heaters 32, temperature probes 34-36, drain valves 102, 104, filter pump 112, reservoir pump 116, and the temperature probe 128 and motor 130 of selector valve 118. The I/O interface 206 may include signal processing circuits that condition incoming and outgoing signals so that the signals are compatible with both the processor 202 and the components with which the processor 202 communicates. To this end, the I/O interface 206 may include analog-to-digital (A/D) and/or digital-to-analog (D/A) converters, voltage level and/or frequency shifting circuits, optical isolation and/or driver circuits, data busses, and/or any other analog or digital circuitry that enables the processor 202 to communicate with the other components of the fryer 10.

The control panels 18, 20 may be operatively coupled to the processor 202 of controller 200 to provide a user interface that allows the operator to interact with the controller 200. The control panels 18, 20 may include a display having suitable audio and visual indicators capable of providing information to the operator. The control panels 18, 20 may also include input devices and controls capable of accepting commands or input from the operator and transmitting the entered input to the processor 202. In this way, the control panels 18, 20 may enable manual initiation or selection of system functions, for example, during set-up of the fryer 10.

Figure 4A:
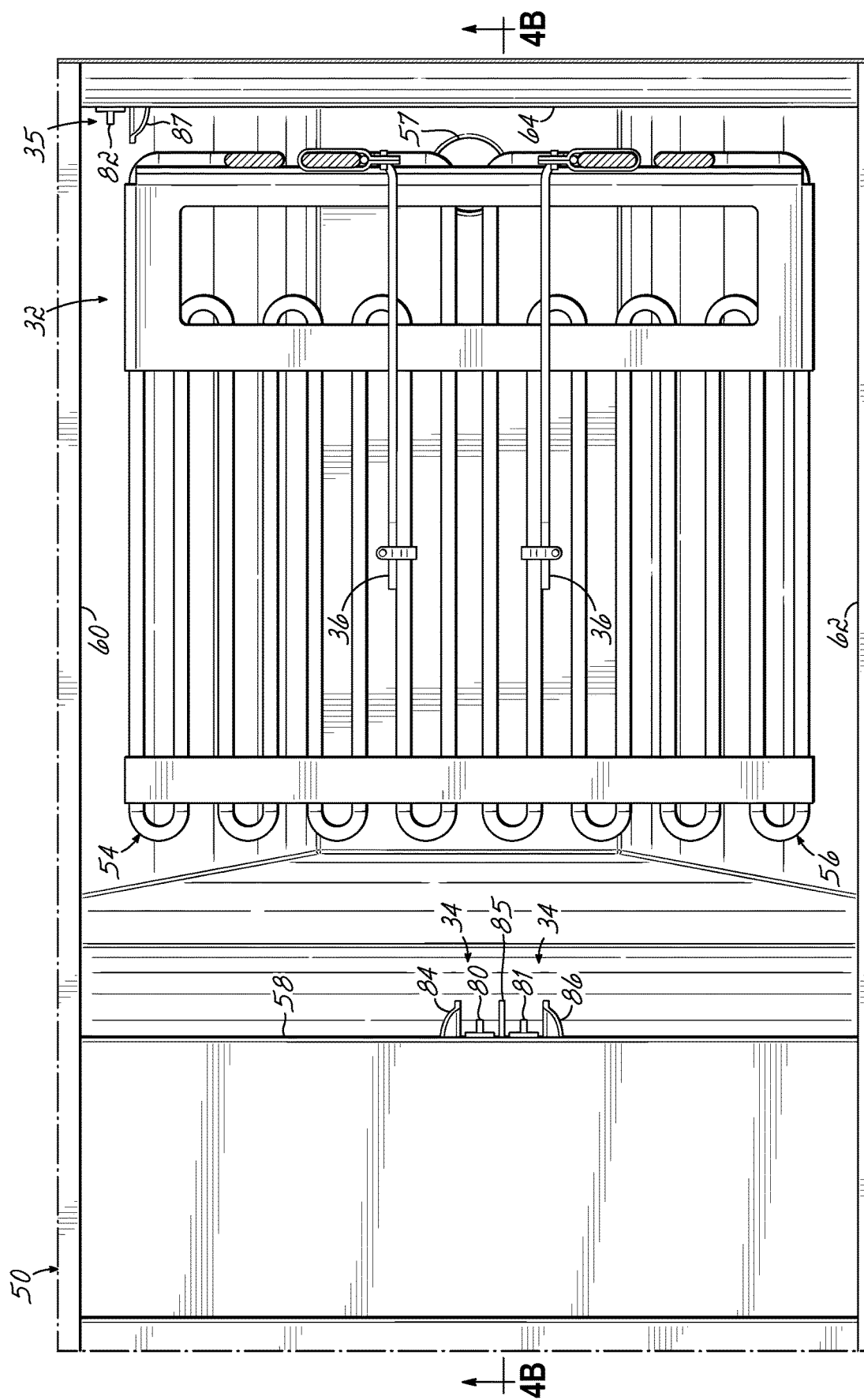
FIG. 4A is a top view of one of the fry pots of FIG. 2 showing details of the heating element and the temperature probes.

FIGS. 4A-4B depict an exemplary fry pot 50 in accordance with an embodiment of the invention. Fry pot 50 includes a heater 32 having electric heating elements 54, 56, a drain valve 57, a front wall 58, side walls 60, 62, a back wall 64, a bottom wall 66, and a fill line 68 indicating an operational level of the cooking medium 44. Low-level temperature probes 34 are attached to the fry pot 50 (e.g., the front wall 58) at a level below the fill line 68, the operational temperature probe 35 is attached to the fry pot 50 (e.g., the back wall 64) at a level below that of the low-level temperature probes, high level cutoff probes 36 are attached to each heating element 54, 56 of heater 32.

Referring now to FIGS. 4C and 4D, and with continued reference to FIGS. 4A and 4B, each of the low-level and operational temperature probes 34, 35 may be attached to the fry pot 50 through an opening in a respective wall of the fry pot 50 and may include a temperature sensing element 80-82 that projects outward from the wall. The fry pot 50 may also include shields 84-87 that project outward from the walls of fry pot 50. The shields 84-87 may be configured to protect the probes 34, 35 from being damaged by contact with an object in the fry pot 50, such as a basket of food product or a tool (e.g., a scraper or brush) used to clean the fry pot 50. The low-level temperature probes 34 may be vertically offset from each other by a distance $d_1$, and horizontally offset from each other by a distance $d_2$. The vertical offset $d_1$ may be configured to provide the controller 200 with an ability to determine multiple states. For example, the vertical offset distance $d_1$ may facilitate the determination of multiple low-level warning levels (e.g., cooking medium is low, very low, etc.), whether the fry pot 50 is over-filled (e.g., the upper low-level temperature probe is covered by the cooking medium 44), or to sense that the basket has been lowered into the fry pot 50 (e.g., the upper low-level temperature probe is not covered when the basket is not submerged in the cooking medium 44, and is covered when the basket is submerged in the cooking medium 44).

Figure 5:
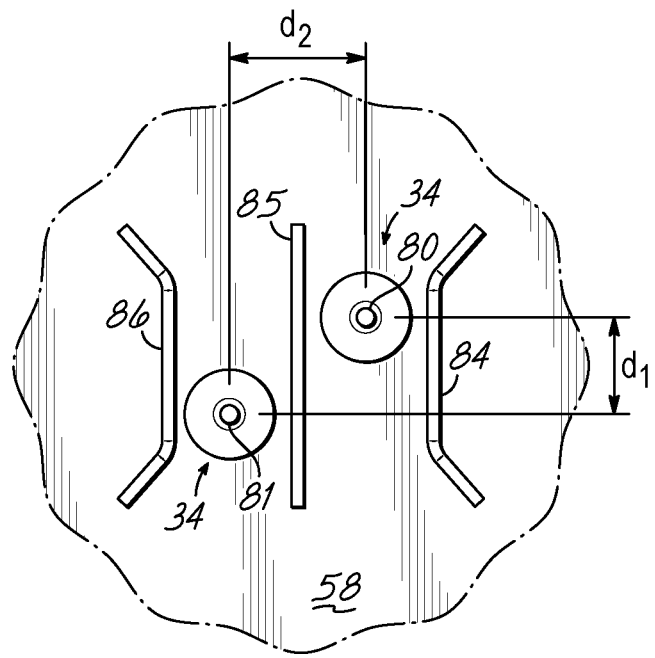
FIG. 5 is a flow chart depicting a process for detecting a condition of the fryer and setting a state flag based thereon.
Figure 5:
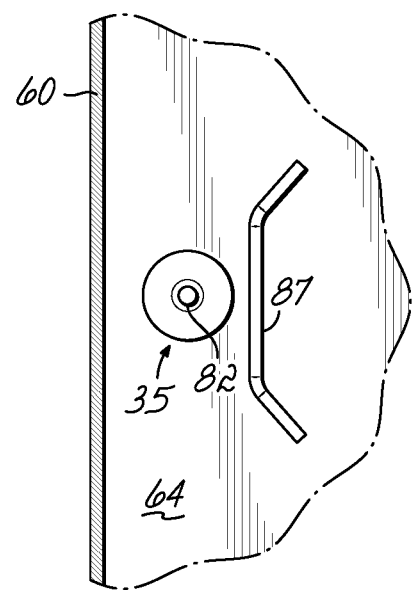
Figure 5:
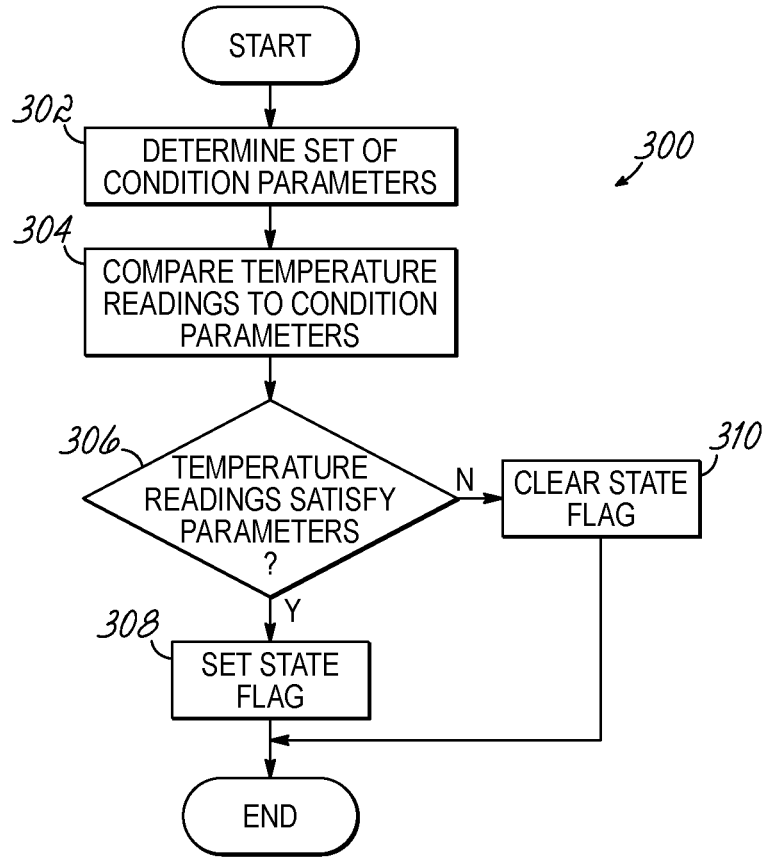

FIG. 5 presents a flowchart depicting a process 300 that may be executed by the controller 200 to determine a state of the fryer 10 using signals received from the temperature probes 34-36. In block 302, the process 300 may determine a set of condition parameters. The process 300 may determine the set of condition parameters, for example, by querying a database for a set of one or more condition parameters associated with a specific operating condition, the presence of which is being evaluated by the process 300.

One example of a condition parameter may include a parameter that corresponds to a weighted combination of one or more temperatures, a sum of temperature readings over time, or a rate of change of the temperature over time that is associated with the condition in question. This weighted combination may provide a condition parameter that can be used by a proportional-integral-derivative (PID) control process, for example, which compares a predetermined value of the condition parameter to a corresponding value determined from temperature readings produced by the temperature probes 34-36.

Another example of a condition parameter may include a parameter that corresponds to a weighted combination of one or more differences between two or more temperatures, a sum of the differences over time, or a rate of change of the differences over time. This weighted combination of differences may also provide a condition parameter that can be used by a PID control process as described above. In any case, each condition parameter may provide a threshold value or range of values above, below, within, or outside of which the values determined from the temperature readings obtained by the controller 200 must fall to determine that the condition is present in the fryer 10.

In response to determining the condition parameters, the process 300 may proceed to block 304 and compare the temperature readings or combinations thereof, which may include current readings and/or temperature readings stored in memory, to the condition parameters. By way of example, the set of condition parameters for entering a hard trip state may be that the temperature indicated by the signal from the high limit temperature probe 36 is greater than or equal to a predetermined temperature threshold, e.g., 425° F. In this case, the set of condition parameters is a single parameter that is satisfied if the temperature reading from the high limit temperature probe 36 is greater than or equal to the predetermined temperature threshold defined by the set of condition parameters. As another example, the set of condition parameters for entering a pre-hard trip state or a hard trip imminent state may be that the current temperature indicated by the high limit temperature probe is greater than or equal to another predetermined temperature threshold (e.g., 400° F.), and the rate of change of this temperature is greater than or equal to a predetermined rate threshold (e.g., 1° F. per second). In this case, the set of condition parameters contains two parameters, and is satisfied if both the temperature reading and rate of change of the readings from the high limit temperature probe 36 are greater than or equal to the predetermined thresholds defined by the set of condition parameters.

In other cases, the condition parameters may include or depend on a current state of the fryer 10. For example, if the fryer 10 is in the hard trip state, the set of condition parameters for re-entering a normal state may be that the temperature indicated by the high limit temperature probe is less than yet another predetermined threshold, e.g., 410° F.

In block 306, the process 300 may determine if the temperature readings satisfy the set of condition parameters for the operating condition being evaluated. If the temperature readings satisfy the condition parameters ("YES" branch of decision block 306), the process 300 may proceed to block 308 and set a corresponding state flag. Setting the state flag may notify other processes (e.g., a cooking cycle process) being executed by the controller 200 that the fryer 10 is currently in the state in question. Existence of a state may cause these other processes to take certain actions. For example, in response to the fryer 10 entering the hard trip state or pre-hard trip state described above, a cooking cycle process may deactivate or otherwise adjust the output of the heater 32. If the temperature readings do not satisfy the condition parameters ("NO" branch of decision block 306), the process 300 may proceed to block 310 and clear the corresponding state flag. Clearing the state flag may notify the other processes being executed by the controller 200 that the fryer 10 is no longer in the state in question.

Embodiments of the invention may monitor the temperature of the high limit temperature probe 36 and incorporate the temperature readings obtained from this probe into one or more processes executed by the controller 200. By comparing the temperature readings provided by the high limit temperature probe 36 with readings from the low-level temperature probe 34 and/or operational temperature probe 35, the controller 200 can determine when the high limit module is getting close to a hard trip. In response to this determination, the controller 200 may regulate the heater 32 accordingly to avoid entering the hard trip state.

Advantageously, the controller 200 may provide improved protection against activation of the fryer 10 when there is insufficient cooking medium 44 in the fry pot (a condition sometimes referred to as a "dry fire") as compared to fryers lacking the features described herein. The controller 200 may also use temperature data obtained from the temperature probes 34-36 to deactivate the heater 32 if the operating conditions indicate that the fry pot does not contain a suitable heat sink, such as cooking oil or water. Data from temperature probes inside the fry pot may be used in combination to allow detection of conditions that exist only when the fry pot is substantially empty, i.e., empty or almost empty. Time-based information from a single probe or multiple probes may also be used to detect substantially empty fry pot conditions.

More advantageously, the improved control provided by embodiments of the invention may reduce the amount of down time for the fryer 10 due to "nuisance tripping" of the high limit module 150 by recognizing the existence of an imminent high limit trip condition. A high limit trip may cause the high limit module 150 to cut off the supply of gas or electricity to the heater 32. To use the fryer 10 after a high limit trip condition, the operator may be required to reset the high limit module 150 after waiting for the temperature at the high limit temperature probe 36 to fall below a predetermined threshold. By regulating the output of the heater 32 using temperature readings from the high limit probe 36, embodiments of the invention may reduce the output of the heater 32 before the high limit trip condition is reached. This may save the operator the time and effort of resetting the fryer 10 as compared to conventional systems in which the controller 200 is not in communication with the high limit probe 36.

The processes executed by the controller 200 to control the heater 32 may be configured to consider heat transfer characteristics of the heater 32 and temperature dependent flow characteristics of the cooking medium 44. For example, the material from which the fry pot 12, 14 is made may have a continuous use temperature (e.g., 800° F.) above which the fry pot should not be operated for an extended time. Thus, the control processes may be configured to limit the temperatures of the fry pot material to less than the continuous use temperature. In contrast, the high limit temperature control processes and/or high limit module 150 may be configured to prevent cooking medium temperatures from exceeding a maximum allowable temperature, e.g., 446° F. outside of the United States and 475° F. within the United States. The use of signals from the high limit probe 36 may allow the controller 200 to maximize the temperature of the cooking medium 44 while protecting the fryer operator from cooking delays and interruptions.

In general, the routines executed to implement the embodiments of the invention, whether implemented as part of an operating system or a specific application, component, program, object, module or sequence of instructions, or a subset thereof, may be referred to herein as "computer program code," or simply "program code". Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

Various program code described herein may be identified based upon the application within which it is implemented in specific embodiments of the invention. However, it should be appreciated that any particular program nomenclature which follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of information, such as computer-readable instructions, data structures, program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatuses, or other devices to function in a particular manner, such that the instructions stored in the computer-readable medium produce an article of manufacture including instructions that implement the functions, acts, and/or operations specified in the flow-charts, sequence diagrams, and/or block diagrams. The computer program instructions may be provided to one or more processors of a general-purpose computer, a special purpose computer, or other programmable data processing apparatus to produce a machine, such that the instructions, which execute via the one or more processors, cause a series of computations to be performed to implement the functions, acts, and/or operations specified in the flow-charts, sequence diagrams, and/or block diagrams.

In certain alternative embodiments, the functions, acts, and/or operations specified in the flow-charts, sequence diagrams, and/or block diagrams may be re-ordered, processed serially, and/or processed concurrently consistent with embodiments of the invention. Moreover, any of the flow-charts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, actions, steps, operations, elements, and/or components, but do not preclude the presence or addition of one or more other features, integers, actions, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments, and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A fryer comprising:
a fry pot;
a heater configured to heat a cooking medium in the fry pot;
a high limit temperature probe that provides a first signal indicative of a first temperature in the fry pot;
an operational temperature probe that provides a second signal indicative of a second temperature in the fry pot;
a high limit module in communication with the high limit temperature probe and that selectively decouples the heater from an energy source in response to the first signal indicating the first temperature has exceeded a first threshold temperature defining a high limit trip condition; and
a controller in communication with the high limit temperature probe and the operational temperature probe, the controller operating the fryer such that the controller:
determines, based at least in part on the first signal and based at least in part on the second signal, if the fryer is in a state indicative of an imminent high limit trip condition;
in response to determining that the fryer is in a state indicative of the imminent high limit trip condition, preemptively adjusts an output of the heater to avoid the high limit trip condition; and
controls a temperature of the cooking medium in the fry pot, based at least in part on the second signal.

2. The fryer of claim 1, further comprising:
a holder that thermally and mechanically couples the operational temperature probe to a wall of the fry pot.

3. The fryer of claim 1, further comprising:
a low-level temperature probe that provides a second signal indicative of a second temperature in the fry pot to the controller,
wherein the controller is further configured to determine if the fryer is in the state indicative of the imminent high limit trip condition based at least in part on the second signal.

4. The fryer of claim 3, further comprising:
a holder that thermally and mechanically couples the low-level temperature probe to a wall of the fry pot.

5. The fryer of claim 1, further comprising:
a holder that thermally and mechanically couples the high limit temperature probe to the heater.

6. A method of controlling a fryer, comprising:
receiving, at a controller, a first signal indicative of a first temperature in a fry pot of the fryer from a high limit temperature probe;
receiving, with the controller, a second signal indicative of a second temperature in the fry pot from an operational temperature probe;
controlling, with the controller, a temperature of a cooking medium in the fry pot based at least in part on the second signal;
decoupling, with a high limit module, a heater of the fryer from an energy source in response to the first signal indicating the first temperature has exceeded a first threshold temperature defining a high limit trip condition;
determining, by the controller based at least in part on the first signal and based at least in part on the second signal, if the fryer is in a state indicative of an imminent high limit trip condition; and
in response to determining that the fryer is in a state indicative of an imminent high limit trip condition, preemptively adjusting, by the controller, an output of the heater of the fryer to avoid the high limit trip condition.

7. The method of claim 6, further comprising:
mechanically and thermally coupling, by a holder, the operational temperature probe to a wall of the fry pot; and
mechanically and thermally coupling, by another holder, the high limit temperature probe to the heater.

8. A computer program product for controlling a fryer, the computer program product comprising:
a non-transitory computer-readable storage medium; and
program code stored on the non-transitory computer-readable storage medium that, when executed by one or more processors of the fryer, causes the fryer to:
receive a first signal indicative of a first temperature in a fry pot of the fryer from a high limit temperature probe;
receive a second signal indicative of a second temperature in the fry pot from an operational temperature probe;
control a temperature of a cooking medium in the fry pot based at least in part on the second signal;
decouple a heater of the fryer from an energy source in response to the first signal indicating the first temperature has exceeded a first threshold temperature defining a high limit trip condition;
determine, based at least in part on the first signal and based at least in part on the second signal, if the fryer is in a state indicative of an imminent high limit trip condition; and
in response to determining that the fryer is in a state indicative of an imminent high limit trip condition, preemptively adjust an output of the heater to avoid the high limit trip condition.

* * * * *